May 8, 1956 A. L. CHRISTIANSEN 2,744,285
FISH SKINNING MACHINE
Filed April 10, 1953 2 Sheets-Sheet 1
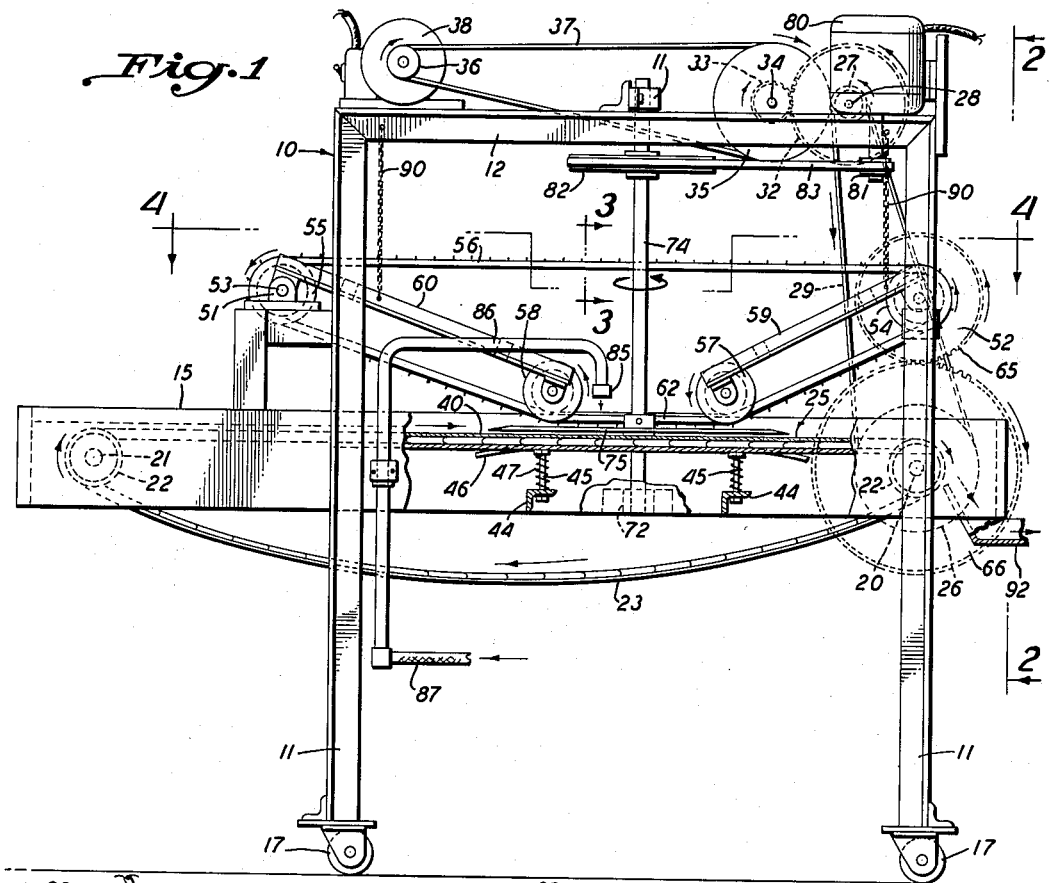
Fig.1
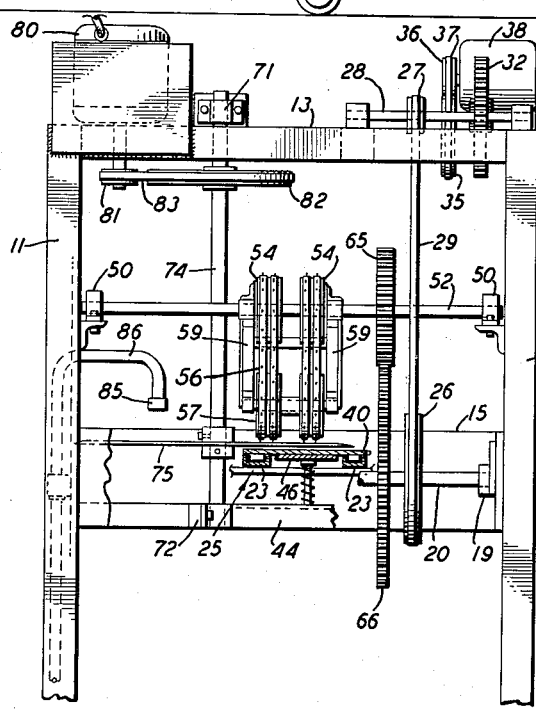
Fig.2
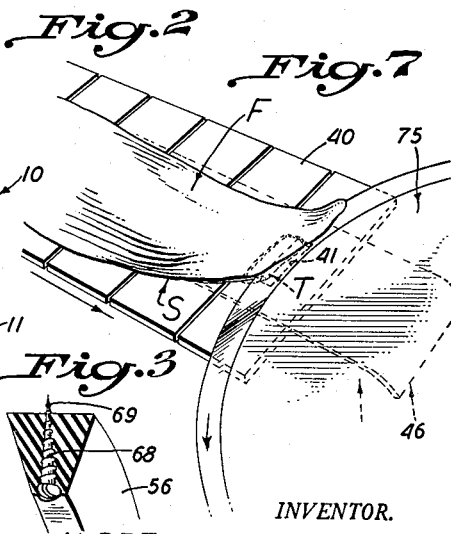
Fig.7
Fig.3
INVENTOR.
ANDREW L. CHRISTIANSEN.
BY
W. J. Stevenson
Agent.

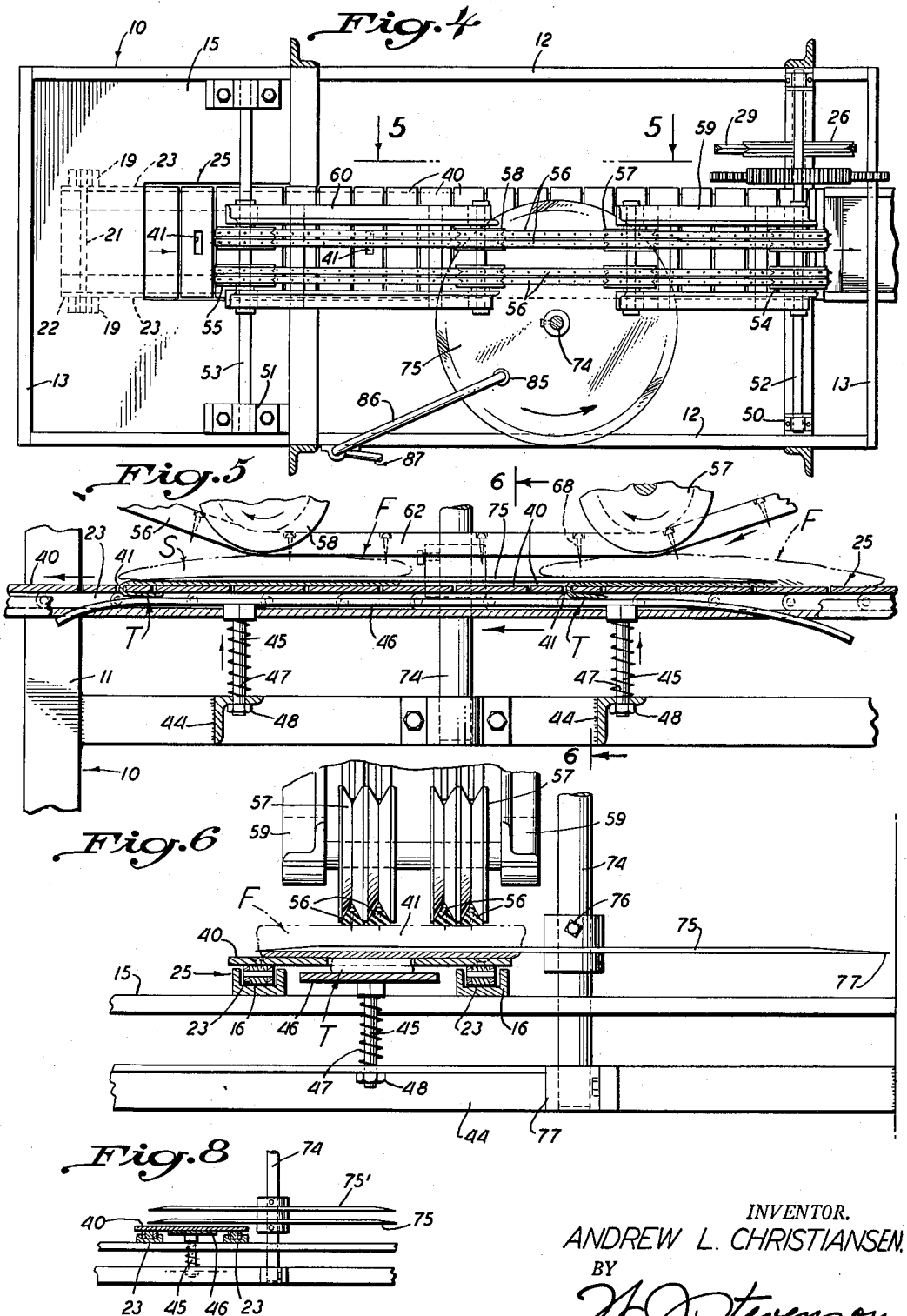

United States Patent Office 2,744,285
Patented May 8, 1956

2,744,285
FISH SKINNING MACHINE

Andrew L. Christiansen, Compton, Calif., assignor of one-half to Wilbur S. Simpson, Los Angeles, Calif.

Application April 10, 1953, Serial No. 347,933

4 Claims. (Cl. 17—2)

This invention relates generally to the fish processing art and more particularly to a machine designed to remove the outer skin from the flesh of fish fillets.

Fish is commonly processed and packaged for sale as fillets, that is, pieces of fish meat from which the bones have been removed. It is highly desirable that the fillets be completely edible, that is, not only free from bones but also devoid of other non-edible portions such as the outer skin. Various means have been proposed for removing the skin from such fish fillets but such devices have not been adopted for various reasons, the most important of which is that the devices are quite impractical and cannot be relied upon to remove completely the undesirable skin portions. Moreover, the prior skinning devices comprise brushes or chopping elements for removing the skins and such elements, not being precision-operated, tend to either cut into and remove part of the fish meat to waste the same, or to leave portions of the skin on the flesh. This deficiency is due largely to the fact that the fish fillets are not properly held during the skinning operation and accurate, relative adjustment between the fish and the skinning elements is not readily attained.

It is an object of this invention to obviate the faults and deficiencies of previous fish skinning machines by providing a machine which is extremely accurate and efficient in removing the skin from fish fillets, the machine operating with precision to remove the entire skin while leaving the flesh or meat undisturbed and intact.

Another object of the invention is to provide a fish skinning machine which includes a horizontal, rotary, circular knife and conveyor means operative to feed the pieces of fish across the knife with the skin in lowermost position, the knife blade being adjustable vertically with precision so as to cause the blade to rotate in a plane in proximity to the skin, that is, at the exact joinder between the skin and the flesh, the skin thus being accurately removed without wasting the meat.

Another object is to provide a machine, of the class referred to, in which the pieces of fish are positively advanced past the revolving cutter blade and held firmly down against the feeding conveyor by means of pressure elements in the form of weighted presser belts. By this means, the fish fillets are firmly seated against the conveyor to cause their skins to move in a plane immediately below the plane of rotary cutter blade.

A further object is to provide a machine of the type indicated which embodies means for gripping and retaining an end of the skin of each fish fillet on the feeding conveyor during the skin-removing operation. This object is best attained by providing spaced apertures in the conveyor through which a thin end of the fillet, for example the extreme tail portion thereof, can be inserted as the fillets are placed individually on the conveyor, the gripping means also including an elongate spring-actuated gripper plate extending beneath the conveyor and operative to fold and retain the inserted end of each fillet beneath the conveyor. By this provision, each fillet is actually pulled across the cutter blade, the point of gripping being always in advance of the cutting point. In accordance with the invention, the gripper plate terminates short of the delivery end of the machine so that the skins are released and allowed to fall from the conveyor into a receptacle.

A still further object of the invention is to provide a fish-skinning machine which is relatively simple in construction, economical to produce, and one which is highly efficient and automatic in operation, it being only necessary to place the fish fillets on the moving conveyor.

Further objects will appear from the following description and from the drawings which are intended for the purpose of illustration only, and in which Fig. 1 is a side elevational view of the improved fish skinning machine;

Fig. 2 is an end elevation of the machine, as viewed in the direction of arrow 2 in Fig. 1;

Fig. 3 is a fragmentary view of a portion of one of the presser belts;

Fig. 4 is a sectional plan view of the machine, taken on line 4—4 of Fig. 1;

Fig. 5 is an enlarged longitudinal sectional view of the central portion of the machine, taken on line 5—5 of Fig. 4;

Fig. 6 is a cross-sectional view, taken on line 6—6 of Fig. 5;

Fig. 7 is a fragmentary perspective view of the rotary knife and associated parts; and Fig. 8 is a small scale view similar to Fig. 6 but showing a pair of the cutter blades in use for simultaneously skinning a fish fillet and slicing the fillet lengthwise.

Referring to the drawings in detail, the present improved fish skinning machine includes a rectangular frame or structure 10 having angle-iron corner posts 11 joined at their upper ends by longitudinal and transverse angle-irons 12 and 13. Intermediate its upper and lower ends, the frame 10 has a box-like support or bed 15 provided with longitudinal, channel-shaped guides 16 (Fig. 6). The frame 10 preferably has rollers or casters 17 by which the machine may be wheeled to a location adjacent a fish cleaning, boning and slicing apparatus to perform the next operation in the over-all fish processing procedure.

Journaled in bearings 19 at the ends of the bed 15 are cross-shafts 20 and 21, each of which carries a pair of sprockets 22 around which the chains 23 of a feeding conveyor 25 extend. One shaft 20 carries a V-belt pulley 26 which is driven from a smaller pulley 27 on a countershaft 28 by means of a V-belt 29. Keyed to the shaft 28 is a large gear 32 which is driven from a smaller gear 33 on a second cross-shaft 34, the shafts 28 and 34 being rotatable in bearings at the upper end of the frame 10. The shaft 34 carries a large pulley 35 which is driven from a small pulley 36 by a V-belt 37, the pulley 36 being keyed to the armature shaft of an electric motor 38.

Secured to and extending between the chains 23 of the conveyor 25 are plates 40 upon which the fish fillets are placed to be conveyed through the machine. Certain of the plates 40, for example every fifth plate, are provided with rectangular apertures 41 through which the tail portions T of the fish fillets F are inserted in a downward direction as the fillets are loaded individually upon the conveyor.

Extending transversely within the bed 15 is a pair of angle-iron supports 44, each having a hole through which a post or spindle 45 extends. Secured to the upper ends of the spindles 45 are the end portions of a gripper-plate 46 which extends longitudinally of the machine within the opening 16. The gripper-plate 46 normally is urged upwardly toward the under surfaces of the conveyor plates 40 by means of springs 47 surrounding the spindles and compressed between the angle-irons 44 and the gripper-plate, such upward movement being limited by the engagement of a head 48 on each spindle against the under sides of the angle-irons.

Journaled in bearings 50 and 51 on the frame 10 are respective cross-shafts 52 and 53 arranged above the conveyor 25. The shafts 52 and 53 carry pairs of V-pulleys 54 and 55 around which extend V-belts 56. The lower portions of the belts 56 also extend around similar pulleys 57 and 58 which are rotatably mounted at the ends of arms 59 and 60 pivoted on the respective shafts 52 and 53. The combined weight of the arms 59 and 60 and their pulleys 57 and 58 is sufficient to cause the latter to descend to a position where they maintain the belts 56 taut and provide straight portions 62 of the belts which extend parallel to and above the upper portion of the feeding conveyor 25. By this means, as the fish fillets are fed longitudinally through the skinning station, the portions 62 of the belts 56 act to press them downwardly and flat against the conveyor plates 40. The belts 56 are driven by the shaft 53 which, in turn, is rotated through the medium of meshing gears 65 and 66 on the respective shafts 53 and 21, the speed ratios being such that the linear speeds of the conveyor 25 and belts 56 are equal. It is to be noted by reference to Figs. 3 and 6 that the belts 56 are provided with means engageable with the fish fillets F to positively prevent slippage between the belts and the fillets. This means preferably consists of common round-head wood screws 68 which are screwed through the belts to provide outwardly projecting ends 69 adapted to penetrate the fillet pieces, the screws providing, in effect, spiral barbs.

Rotatable in vertically spaced bearings 71 and 72 on the frame 10 is a shaft or arbor 74 to which is secured a rotary cutter blade 75, the cutter blade being adjustable vertically on the shaft and retained in adjusted position by a set-screw 76 or the like. As shown best in Fig. 6, the periphery of the circular cutter blade 75 is beveled at its upper portion to provide an acute cutting edge 77. By this single bevel, the bottom surface of the blade, including the cutting edge 77, is planar throughout to provide that the cutting edge may be rotated in a plane close to the plates 40 of the conveyor. The cutter blade 75 preferably is rotated at a relatively high rate of speed from an electric motor 80 mounted at the top of the frame 10. As shown, the motor shaft carries a V-belt pulley 81 which is drivingly connected to a larger pulley 82 on the vertical cutter shaft 74 by means of a V-belt 83.

The present machine is also equipped with means for directing water against the rotary cutter blade 75 during the skinning operation so as to produce a more effective cutting or slicing action. This means consists of a jet or nozzle 85 at the end of a tube 86 secured against the frame 10. A hose 87 extends from a source of water supply and is connected to the tube 86 to supply water to the nozzle 85. The complete skinning machine having now been described, the mode of operation is as next explained.

To prepare the machine for operation, it is only necessary to locate the machine adjacent the source of cleaned, boned and cut pieces or fillets and start the motors 38 and 80. The motor 38, as previously explained, operates the conveyor sprockets 21 and 22 so as to cause the feeding conveyor 25 to travel in the direction indicated by the arrow in Fig. 1. At the same time, the motor drives the pulleys 54 and 55 to cause the presser belts 56 to travel in the direction of the arrow in Fig. 1, the lower portions 62 of the belts 56 thus moving in the same direction and at the same linear speed as the upper portion of the conveyor 25. At this time, the presser portions 62 of the belts 56 are held slightly above the cutter disc or blade 75 by suitable stop means, such as the chains 90. The motor, operating through the driving means 81, 82, 83, 74, rotates the cutter blade 75. Water is next caused to flow through the tube 86 to be directed against the cutter disc 75 and the machine is thus conditioned for operation.

To perform the skinning operation, an attendant of the machine assumes a position at the left-hand or loading end (Fig. 1) of the machine to which end the fish fillets F are delivered by a conveyor (not shown). The operator then places each fillet F flatwise and lengthwise upon the feeding conveyor 25, the piece or side of the fish being so placed that its thin tail portion T is inserted downwardly through one of the apertures 41 of the conveyor. The fillet F thus is supported by the plates 40 with its tail portion T hanging loosely through the aperture 41 and is caused to travel tail first toward the rotating cutter disc 75. It is to be noted also that each fillet F is so placed on the conveyor 25 that its skin S is disposed lowermost, that is, directly upon the conveyor plates 40.

As each fillet F approaches the central portion of the machine, it travels under the pulleys 58 and then under the presser portions 62 of the V-belts 56, the latter parts yielding upwardly as the fillet moves thereunder. At approximately this time, or immediately prior thereto, the hanging or dangling tail end T of the fillet is engaged by the curved end of the gripping element 40 and as the fillet continues to advance, the tail T is folded under the plate 40 having the aperture 41 and subsequently retained thereagainst by the spring-actuated gripper plate 46 during the skinning operation. With the tail T thus firmly anchored to the conveyor 25, the fillet F is positively drawn forwardly.

As each fillet F is advanced to a central position, its portion which is disposed immediately rearwardly of the aperture 41 is contacted by the cutting edge 77 of the rotating cutter disc or knife 75. Now, as the fillet continues its forward travel, the knife 75 performs, in effect, a slicing action, cutting through the fillet at a level immediately above the thin underlying skin S, as shown in Fig. 7. It will be understood that during this skinning action the presser belts 56 exert sufficient downward force against the fillet to maintain the skin S flat against the conveyor plates 40. It is also to be noted that the water, which is directed against the rotating knife 75 by the nozzle 85, serves to improve the slicing action by lubricating the knife to prevent adherence of the fish flesh against the sides of the knife.

When the fillet F emerges from the cutter blade 75 and from under the presser belts 56, its flesh and skin have been completely separated by the combined action of the knife and the pressing and pulling imposed on the fillet. As the skinned fillet F approaches the right-hand or discharge end of the machine, its tail T is released by the gripper-plate 46 so that the fillet simply rests upon the plates 40, due to its own weight. Due to its slippery nature, the flesh or edible portion of the fillet F slides off from the underlying skin S as the supporting conveyor plates 40 reach their extent of right-hand movement and start their return movement around the pulleys 22, the pieces of flesh thus sliding off from the conveyor 25 to be received in a suitable receptacle 92 or to be deposited upon another conveyor which may convey the edible pieces to other apparatus for further processing. The skin S, due to its tail end T being caught in the aperture 41, travels around the pulleys 22 to a further extent before falling off into a container arranged therebelow.

The procedure outlined above is repeated as each fillet is placed on the conveyor to be skinned, the machine thus being automatic in operation. Fish fillets of various sizes, shapes and thicknesses can be processed in the machine, the presser means serving to maintain the skin flat, that is, parallel to the plane of the cutter blade. As explained previously, the cutter knife is adjustable vertically on its shaft in accordance with the thickness of the skin to be removed and by accurately adjusting the knife, complete separation of the skin, without removing any of the edible flesh, is achieved.

In certain instances where relatively thick fillets are to be skinned, it may be desirable to also slice the fillets lengthwise simultaneously with the removing of the undesirable skin. To accomplish this result, I provide a second cutter blade 75' on the shaft 74 as shown in Fig. 8, this knife serving to slice the fillets in a horizontal plane. Of course, when large fish fillets are being processed, additional slicing knives may be employed to provide fish slices suitable for frying or for further processing in the cannery.

In accordance with the provisions of the patent statutes, I have described the principle of operation of my invention, together with the apparatus which I now consider to represent the best embodiments thereof, but I desire to have it understood that the machines shown are only illustrative and that the invention may be carried out by further modified means.

I claim as my invention:

1. A fish skinning machine, comprising: a feed conveyor for feeding pieces of fish in a predetermined path with the skin of each fish piece against a first face of the conveyor and with the tail portion of each fish piece leading, said conveyor including a plurality of plates for supporting the fish pieces, certain of said plates having apertures therein through which the tail portions extend; elongate resilient gripping means operative to grip each tail portion against the opposite face of the conveyor; an endless presser belt movable in the direction of movement of the conveyor and operative to press the fish pieces flat against said first face to cause the skins thereof to move in a plane parallel to the plane of the conveyor; and a circular knife rotatable in a plane parallel to and spaced from said first face a distance substantially equal to the thickness of the skin, said knife being operative to slice through the fish pieces, as the latter are fed past the knife, so as to separate the skins from the flesh.

2. A fish skinning machine, comprising: a substantially horizontal feed conveyor for feeding pieces of fish in a predetermined substantially horizontal path, said conveyor including a plurality of supporting plates providing an upper face upon which the fish pieces are supported for movement in said path with the tail portions of the fish pieces leading, certain of said plates having apertures through which said tail portions depend; an elongate gripper plate extending lengthwise beneath said conveyor adjacent said plates and having a downwardly curved end, said gripper plate being operative to fold said depending tail portions of the feeding fish pieces against the under side of the supporting plates so as to connect the leading ends of said fish pieces to said conveyor for movement therewith with said tail portions moving relative to the gripper plate, yieldable presser belts disposed above the conveyor movable in the direction of feed of the fish pieces and operative to press the fish pieces against said upper faces of said supporting plates to cause the skins thereof to lie flat against said upper faces; and a circular knife rotatable in a plane parallel to and spaced from said upper face a distance substantially equal to the thickness of the skin, said knife being operative to slice through the fish pieces, as the latter are advanced past the knife, so as to separate the skins from the flesh.

3. A fish skinning machine, comprising: a substantially horizontal feed conveyor for feeding pieces of fish in a predetermined substantially horizontal path, said conveyor including a plurality of supporting plates providing an upper face upon which the fish pieces are supported for movement in said path with the tail portions of the fish pieces leading, certain of said plates having apertures through which said tail portions depend; an elongate gripper plate extending lengthwise beneath said conveyor adjacent said plates and having a downwardly curved end, said gripper plate being operative to fold said depending tail portions of the feeding fish pieces against the under side of the supporting plates so as to connect the leading ends of said fish pieces to said conveyor for movement therewith with said tail portions moving relative to the gripper plate, spring means engaging said gripper plate and yieldingly urging the same upwardly toward the under faces of said supporting plates; endless presser belts disposed above the conveyor movable in the direction of feed of the fish pieces and operative to press the fish pieces against said upper faces of said supporting plates to cause the skins thereof to lie flat against said upper faces, said presser means being yieldable in a direction toward and away from said conveyor to accommodate fish pieces of different thicknesses; and a circular knife rotatable in a plane parallel to and spaced from said upper face a distance substantially equal to the thickness of the skin, said knife being operative to slice through the fish pieces, as the latter are advanced past the knife, so as to separate the skins from the flesh.

4. A fish skinning and slicing machine, comprising: a substantially horizontal feed conveyor for feeding pieces of fish in a predetermined substantially horizontal path, said conveyor including a plurality of supporting plates providing an upper face upon which the fish pieces are supported for movement in said path with the tail portions of the fish pieces leading, certain of said plates having apertures through which said tail portions depend; an elongate gripper plate extending lengthwise beneath said conveyor adjacent said plates and having a downwardly curved end, said gripper plate being operative to fold said depending tail portions of the feeding fish pieces against the under side of the supporting plates so as to connect the leading ends of said fish pieces to said conveyor for movement therewith with said tail portions moving relative to the gripper plate; an endless, yieldable, elongate presser means disposed above the conveyor and operative to press the fish pieces against said upper faces of said supporting plates to cause the skins thereof to lie flat against said upper faces; a circular knife rotatable in a plane parallel to and spaced from said upper face a distance substantially equal to the thickness of the skin, said knife being disposed between said presser means and said conveyor and operative to slice through the fish pieces, as the latter are advanced past the knife, so as to separate the skins from the flesh; and a second circular knife rotatable with and above the first-mentioned knife and operative to slice the fish pieces lengthwise during movement of the pieces past said second knife.

References Cited in the file of this patent

UNITED STATES PATENTS

| | | |
|---|---|---|
| 993,173 | Karhu | May 23, 1911 |
| 1,953,558 | Harrild et al. | Apr. 3, 1934 |
| 2,173,336 | Lamere et al. | Sept. 19, 1939 |
| 2,601,292 | Hube | June 24, 1952 |
| 2,645,812 | Jensen | July 21, 1953 |

FOREIGN PATENTS

| | | |
|---|---|---|
| 16,004 | Great Britain | Sept. 21, 1911 |
| 77,233 | Norway | July 31, 1950 |